United States Patent
Inao et al.

(10) Patent No.: US 9,742,166 B2
(45) Date of Patent: Aug. 22, 2017

(54) WIRE HARNESS

(71) Applicant: YAZAKI CORPORATION, Tokyo (JP)

(72) Inventors: Shinichi Inao, Shizuoka (JP); Hideomi Adachi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/047,308

(22) Filed: Feb. 18, 2016

(65) Prior Publication Data

US 2016/0164269 A1 Jun. 9, 2016

Related U.S. Application Data

(63) Continuation of application No. PCT/JP2014/071787, filed on Aug. 20, 2014.

(30) Foreign Application Priority Data

Aug. 20, 2013 (JP) ................. 2013-170338

(51) Int. Cl.
*H02G 3/04* (2006.01)
*B60R 16/02* (2006.01)
*H01B 7/00* (2006.01)
*H01B 7/18* (2006.01)

(52) U.S. Cl.
CPC ........... *H02G 3/04* (2013.01); *B60R 16/0207* (2013.01); *B60R 16/0215* (2013.01); *H01B 7/0045* (2013.01); *H01B 7/184* (2013.01); *H02G 3/0468* (2013.01)

(58) Field of Classification Search
USPC ....................................................... 174/72 A
See application file for complete search history.

(56) References Cited

U.S. PATENT DOCUMENTS 9,365,171 B2 * 6/2016 Shitamichi .......... B60R 16/0222
2005/0045357 A1 3/2005 Ichikawa et al.
(Continued)

FOREIGN PATENT DOCUMENTS

CN 101595011 A 12/2009
JP 3-154324 A 6/1996
(Continued)

OTHER PUBLICATIONS

International Search Report and Written Opinion of the International Search Report for PCT/JP2014/071787 dated Sep. 30, 2014.
(Continued)

*Primary Examiner* — Dhirubhai R Patel
(74) *Attorney, Agent, or Firm* — Kenealy Vaidya LLP

(57) ABSTRACT

A wire harness is provided with an electrically conductive path, and a tubular sheath member into which the electrically conductive path is inserted. The sheath member includes a straight portion having strength to limit bending. A bellows-shaped portion which is wavy in shape in a tube circumferential direction, is formed in a portion of the straight portion in a sectional view. The bellows-shaped portion is more flexible than a portion of the straight portion other than the bellows-shaped portion.

6 Claims, 9 Drawing Sheets

(56) References Cited

U.S. PATENT DOCUMENTS

| | | | | |
|---|---|---|---|---|
| 2010/0283287 | A1* | 11/2010 | Toyozumi | B60R 16/0215 296/146.9 |
| 2011/0127084 | A1 | 6/2011 | Ichikawa et al. | |
| 2013/0292154 | A1* | 11/2013 | Aoyama | B60R 16/0215 174/105 R |
| 2014/0041899 | A1* | 2/2014 | Inagaki | B60R 16/0215 174/152 G |
| 2015/0101842 | A1* | 4/2015 | Han | B60R 16/0222 174/50.57 |

FOREIGN PATENT DOCUMENTS

| | | | |
|---|---|---|---|
| JP | 2005-80449 A | 3/2005 | |
| JP | 2009-143326 A | 7/2009 | |
| JP | 2010-47033 A | 3/2010 | |
| JP | 2013-243924 A | 12/2013 | |
| JP | 2013-252050 A | 12/2013 | |

OTHER PUBLICATIONS

English language Written Opinion of the International Search Report for PCT/JP2014/071787 dated Sep. 30, 2014.
Chinese Office Action for the related Chinese Patent Application No. 201480045834.2 dated Feb. 24, 2017.

* cited by examiner

FIG.5
| | COMPARATIVE EXAMPLE 1 | COMPARATIVE EXAMPLE 2 | EMBODIMENT |
|---|---|---|---|
| SHAPE OF SECTION | 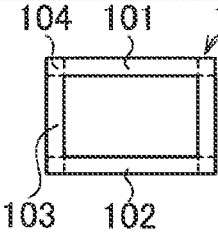 | 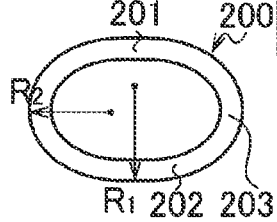 | 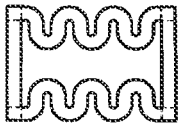 |
| RIGIDITY | ◎ | × | ○ |
| FLYING STONE RESISTANCE PERFORMANCE | × | ○ | ◎ |
| ELECTRIC WIRE RATTLING SUPPRESSION | × | × | ◎ |
| COST ADVANTAGE | ◎ | × | △ |

FIG.8

| | COMPARATIVE EXAMPLE 1 | COMPARATIVE EXAMPLE 2 | SECOND EMBODIMENT |
|---|---|---|---|
| SHAPE OF SECTION | 104 101 100 / 103 102 | A 201 200 / R₂ / A R₁ 202 203 | |
| RIGIDITY | ◎ | × | ◎ |
| FLYING STONE RESISTANCE PERFORMANCE | × | ○ | ◎ |
| ELECTRIC WIRE RATTLING SUPPRESSION | × | × | ◎ |
| COST ADVANTAGE | ◎ | × | ○ |

WIRE HARNESS

CROSS REFERENCE TO RELATED APPLICATIONS

This application is a continuation of PCT application No. PCT/JP2014/071787, which was filed on Aug. 20, 2014 based on Japanese Patent Application (No. 2013-170338) filed on Aug. 20, 2013, the contents of which are incorporated herein by reference.

BACKGROUND OF THE INVENTION

Field of the Invention

The present invention relates to a wire harness.

Description of Related Art

A wire harness electrically connecting together high-voltage devices mounted in a hybrid vehicle or an electric vehicle is known in the related art. The wire harness is configured to include an electrically conductive path, and a sheath member accommodating the electrically conductive path therein as main components. The sheath member is formed to have a long tubular shape. Upon consideration of protection of the electrically conductive path, a limitation to the path of the electrically conductive path, and an ease of assembling a wire harness to a vehicle, desirably, the sheath member is unlikely to be bent even if bending stress is applied to the sheath member.

In contrast, in another known configuration of the sheath member, a flexible portion is selectively set so as to secure the freedom of bending according to a routing path, or to allow easy handling during packing or transportation. Specifically, the sheath member is structured such that a flexible corrugated portion (is made of resin) and a straight portion (is made of resin) unlikely to be bent even if bending stress is applied thereto are connected in series to each other. The straight portion is routed on a vehicle under-floor panel, and serves to protect a wire harness from flying stones.

[Patent Literature 1] JP-A-2010-47033

The straight portion preferably has high rigidity with an ease of assembling the wire harness to the vehicle under-floor panel being taken into consideration. However, since a straight portion has high rigidity in a wire harness disclosed in Patent Literature 1, the straight portion is not capable of absorbing and distributing impact force of a flying stone, and cracking is likely to occur in the straight portion.

The present invention is made to solve this problem, and an object of the present invention is to provide a wire harness with a sheath member suppressing degradation of ease of assembly and reducing the possibility of cracking.

SUMMARY

One or more embodiments provide an electrically conductive path, and a tubular sheath member into which the electrically conductive path is inserted. The sheath member includes a straight portion having strength to limit bending. A bellows-shaped portion is formed in a portion of the straight portion in a sectional view, and is wavy in shape in a tube circumferential direction. The bellows-shaped portion is more flexible than a portion of the straight portion other than the bellows-shaped portion.

According to the wire harness of the present invention, a portion of the straight portion in a sectional view forms the bellows-shaped portion that is wavy in shape in the tube circumferential direction. The bellows-shaped portion is more flexible than a portion of the straight portion other than the bellows-shaped portion. As a result, even if a flying stone comes into contact with a portion of the bellows-shaped portion, the bellows-shaped portion more flexible than other portions is capable of absorb impact of the flying stone. Since the bellows-shaped portion has a wave-like shape, the bellows-shaped portion is capable of distributing impact of a flying stone, and reducing the possibility of cracking. Since a portion of the straight portion in a sectional view forms the bellows-shaped portion, and other portions are not formed in a bellows shape, the straight portion has sufficient rigidity, and is capable of suppressing degradation of ease of assembly. Particularly, since the bellows-shaped portion is wavy in shape in the tube circumferential direction, the bellows-shaped portion is unlikely to be bent in a tube axial direction, and a decrease in the rigidity of the bellows-shaped portion is suppressed. Accordingly, it is possible to provide the wire harness with the sheath member suppressing degradation of ease of assembly and reducing the possibility of cracking.

In the wire harness of one or more embodiments, the straight portion may have a substantially rectangular section, and the bellows-shaped portion is formed in at least a lower wall positioned on a lower side when the wire harness is routed.

According to one or more embodiments, the straight portion has a substantially rectangular section, and the bellows-shaped portion is formed in at least the lower wall positioned on the lower side when the wire harness is routed. As a result, the bellows-shaped portion is formed at a spot with which a flying stone is most likely to come into contact, and thus it is possible to further reduce the possibility of cracking.

In the wire harness of one or more embodiments, the straight portion may include the lower wall, an upper wall facing the lower wall, and side walls that are connected to the lower wall and the upper wall via corner portions.

According to one or more embodiments, the lower wall and the upper wall are connected to the side walls via the corner portions. For this reason, high-rigidity portions such as the corner portions limit the vertical bending of the straight portion, and it is possible to more easily give sufficient rigidity to the under-floor straight portion.

In the wire harness of one or more embodiments, the bellows-shaped portion may be formed in only the lower wall of the straight portion.

According to one or more embodiments, the bellows-shaped portion is formed in only the lower wall, that is, the bellows-shaped portion is formed at a spot with which a flying stone is most likely to come into contact, and the other three surfaces are not formed in a bellows shape, and thus it is possible to reduce manufacturing costs.

In the above description, the phrase "having strength to limit bending" implies that the straight portion is not freely bended, and when the straight portion is bent, the straight portion is folded, or is plastically deformed.

The sentence "the bellows-shaped portion is more flexible than a portion of the straight portion other than the bellow-shaped portion" implies that when a flying stone comes into contact with the bellows-shaped portion, the bellows-shaped portion absorbs and distributes impact of the flying stone better than the portion of the straight portion other than the bellows-shaped portion. Accordingly, the configuration of the bellows-shaped portion does not include a configuration in which grooves or ribs extending in the tube axial direction are merely formed in a portion of the straight portion in sectional view to have recessions and protrusions, but not to absorb and distribute impact.

According to one or more embodiments, it is possible to provide a wire harness with a sheath member suppressing degradation of ease of assembly, and reducing the possibility of cracking.

BRIEF DESCRIPTION OF THE DRAWINGS

FIG. 5 is a table illustrating various performance characteristics of an under-floor straight portion of the sheath member in the first embodiment, and various performance characteristics of an under-floor straight portion of a sheath member in each of comparative examples.

FIG. 8 is a table illustrating various performance characteristics of the under-floor straight portion of the sheath member in the second embodiment, and various performance characteristics of the under-floor straight portion of the sheath member in each of the comparative examples.

DETAILED DESCRIPTION

Hereinafter, preferred embodiments of the present invention will be described with reference to the accompanying drawings; however, the present invention is not limited to the following embodiments.

Figure 1:
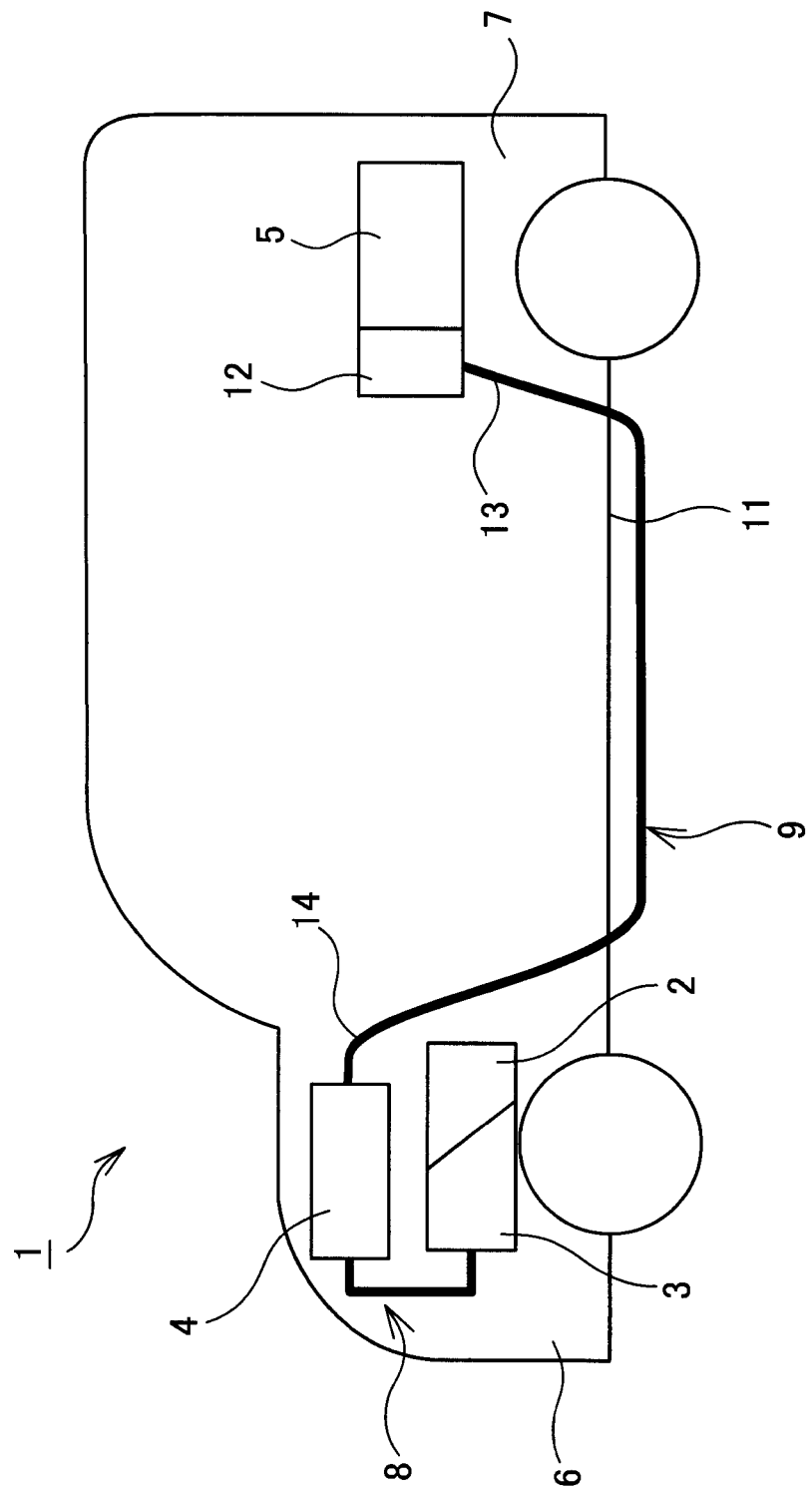
FIG. 1 is a schematic view illustrating a routing state of a wire harness in a first embodiment of the present invention.

FIG. 1 is a schematic view illustrating a routing state of a wire harness in a first embodiment of the present invention. As illustrated in FIG. 1, a wire harness 9 in the first embodiment is used in a hybrid vehicle 1, and is routed at a predetermined position in the hybrid vehicle 1.

The hybrid vehicle 1 is a vehicle driven by driving power from a combination of two power sources, that is, an engine 2 and a motor unit 3. Electrical power is supplied from a battery 5 (battery cell pack) to the motor unit 3 via an inverter unit 4. The engine 2, the motor unit 3, and the inverter unit 4 are mounted in an engine compartment 6 in the vicinity of the front wheels. The battery 5 is mounted in a vehicle rear portion 7 in the vicinity of the rear wheels; however, the battery 5 may be mounted in a vehicle interior that is present on the rear side of the engine compartment 6.

The motor unit 3 is connected to the inverter unit 4 via a wire harness 8. The battery 5 is connected to the inverter unit 4 via a wire harness 9. With suppression of radiation noise or the like being taken into consideration, the wire harness 9 is disposed on a vehicle under-floor panel 11, and is routed substantially in parallel with the vehicle under-floor panel 11. The vehicle under-floor panel 11 is a well-known body structure or body member, and is a so-called panel member. Through holes are formed in the vehicle under-floor panel 11 at predetermined positions. The wire harness 9 is water-tightly inserted into the through holes, and both end portions of the wire harness 9 are respectively guided to the engine compartment 6 and the vehicle rear portion 7.

The wire harness 9 is connected to the battery 5 via a junction block 12 provided in the battery 5. A rear end 13 of the wire harness 9 is electrically connected to the junction block 12. A front end 14 of the wire harness 9 is electrically connected to the inverter unit 4.

The motor unit 3 serves as a motor and a generator, and is a motor assembly including a shielded case. The inverter unit 4 is configured to include an inverter and a converter, and is an inverter assembly including a shielded case. The battery 5 is a Ni-MH battery or a Li-ion battery, and is built as a module. A power storage device such as a capacitor can also be used as the battery 5.

Figure 2:
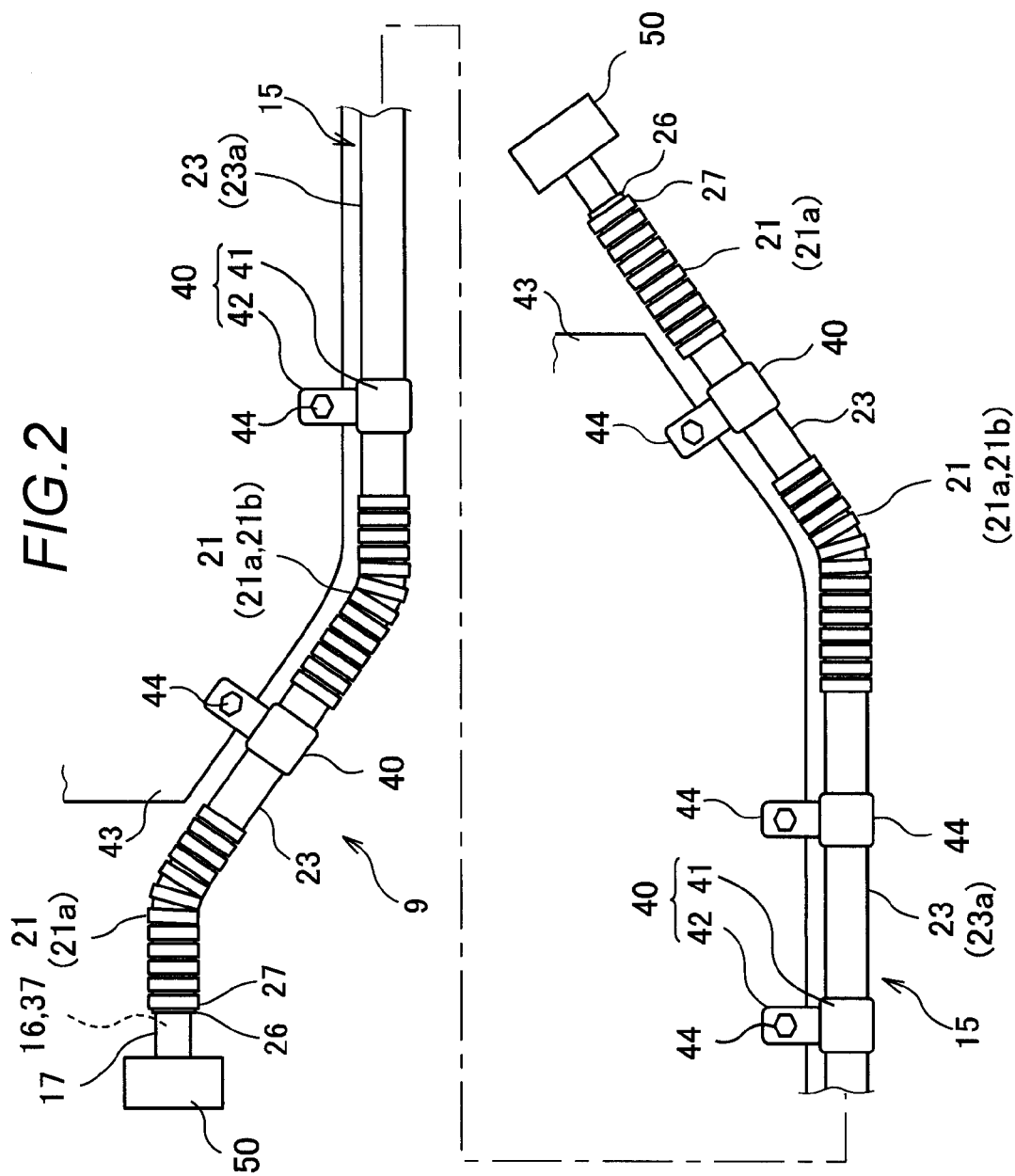
FIG. 2 is a schematic side view illustrating the wire harness when the wire harness is routed on a path.
Figure 3:
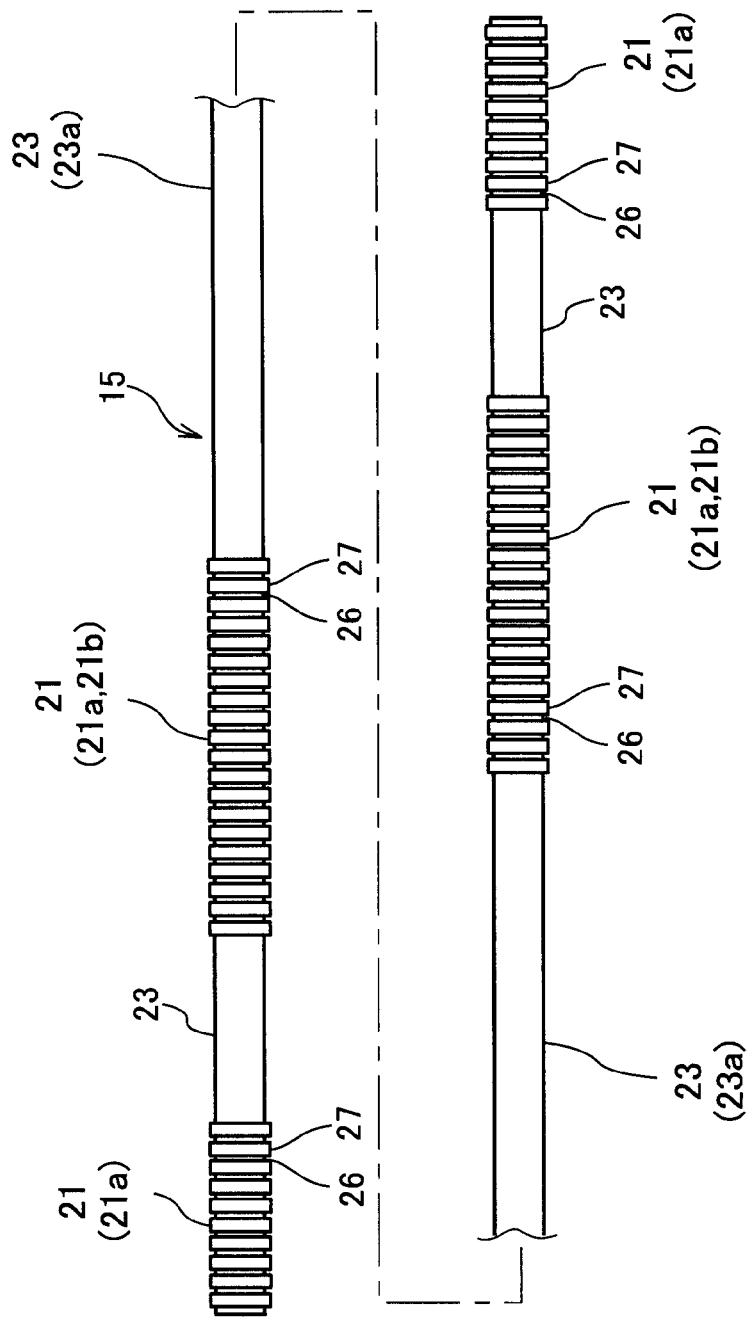
FIG. 3 is a schematic side view illustrating a sheath member.
Figure 4:
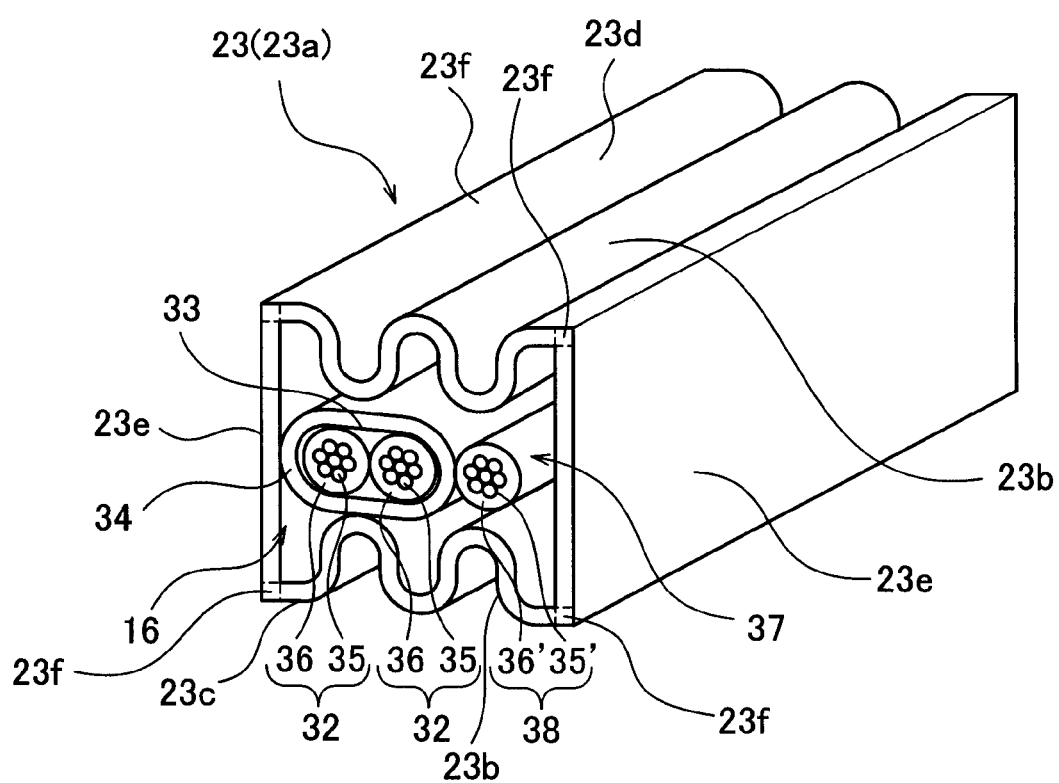
FIG. 4 is a perspective view of the sheath member.

FIG. 2 is a schematic side view illustrating the wire harness 9 when the wire harness is routed on a path, FIG. 3 is a schematic side view illustrating a sheath member 15, and FIG. 4 is a perspective sectional view of the sheath member 15.

The wire harness 9 is configured to include the sheath member 15, and a high voltage electrically conductive path (electrically conductive path) 16 (is accommodated in and protected by the sheath member 15) as main components. The sheath member 15 may accommodate and protect a low voltage electrically conductive path 37 in addition to a high voltage electrically conductive path 16.

The sheath member 15 is a member accommodating at least the high voltage electrically conductive path 16 therein, and protecting the high voltage electrically conductive path 16. The sheath member 15 is made of a tubular member with a substantially rectangular section. The sheath member 15 is made of resin by molding, and has a length required for the high voltage electrically conductive path 16 to be inserted thereinto and accommodated therein, and a thickness required to protect the high voltage electrically conductive path 16.

The sheath member 15 is shaped in such a way as not to include a seam or a slit passing through the sheath member 15 from an outer circumferential surface to an inner circumferential surface of the sheath member 15. The reason for this is that infiltration of moisture into the sheath member 15 is prevented due to a seam or a slit not being provided, thereby resulting in an improvement in waterproof properties. Another reason is that the protrusion of the high voltage electrically conductive path 16 from a flexed portion can be prevented. Still another reason is that the rigidity of the sheath member 15 can be increased.

The sheath member 15 includes one or more corrugated portions (first sheath portions) 21, and one or more straight portions (second sheath portions) 23. The corrugated portions 21 and the straight portions 23 are connected in series to each other. The entirety of the sheath member 15 is straight when the corrugated portions 21 are not flexed. Each of the corrugated portion 21 and the straight portion 23 is set to have a range (length) at an arbitrary position in a tube axial direction of the sheath member 15.

The corrugated portion 21 is a portion of the sheath member 15 which has predetermined flexibility. The flexibility of the corrugated portion 21 enables the sheath member 15 to be flexed at a predetermined angle.

The corrugated portion 21 includes a first corrugated portion (sheath portion for routing) 21a that is flexed into a bent shape along the routing path of the wire harness 9, and a second corrugated portion (sheath portion for packing) 21b that is flexed into a bent shape conforming to a packed or transportation state of the wire harness 9.

As illustrated in FIG. 2, the first corrugated portion 21a is disposed in order for the sheath member 15 to conform to the shape of a vehicle mounting portion, that is, the shape of a routing destination of the wire harness 9. The first corrugated portion 21a is formed to have the length in order for the sheath member 15 to conform to the shape of the routing destination. Accordingly, the first corrugated portion 21a enables the sheath member 15 to be flexed to have the length at the angle required to conform to the shape of the vehicle mounting portion.

The second corrugated portion 21b is disposed in order for the sheath member 15 to conform to the bent shape required for packing and transportation. The second corrugated portion 21b is formed to have the length in order for the sheath member 15 to confirm to the bent shape. Accordingly, the second corrugated portion 21b enables the sheath member 15 to be flexed at the desired angle conforming to a packed or transportation state of the wire harness 9.

The first corrugated portion 21a may also serve as the second corrugated portion 21b. In contrast, the second corrugated portion 21b may also serve as the first corrugated portion 21a.

The section of the corrugated portion 21 is a substantially rectangular shape in a direction perpendicular to the tube axial direction. The corrugated portion 21 has a bellows shape in which recessions and protrusions are repeatedly disposed in the tube axial direction. Specifically, the corrugated portion 21 has a configuration such that recessed portions 26 and protruding portions 27 are formed in a circumferential direction of the corrugated portion 21, and are alternately disposed along the tube axial direction. The corrugated portion 21 may have shapes other than a bellows shape, and the shape of the corrugated portion 21 is not limited to a specific shape insofar as the shape gives flexibility.

A straight portion 23 is a portion of the sheath member 15 which is less flexible than the corrugated portion 21. Preferably, the straight portion 23 is a portion capable of maintaining the original shape against bending stress, that is, a portion having strength required to limit the bending of the sheath member 15 in the tube axial direction. It is possible to secure rigidity of the entirety of the sheath member 15 due to the presence of the straight portion 23. The straight portion 23 serves as a portion on which a clamp 40 (to be described later) is mounted.

The straight portion 23 includes an under-floor straight portion 23a routed on the vehicle under-floor panel 11. The under-floor straight portion 23a is formed to have a long length because the under-floor straight portion 23a is routed on the vehicle under-floor panel 11 (for example, because the under-floor straight portion 23a is routed along a reinforcement member). When the long length of the under-floor straight portion 23a causes a problem to the transportation of the wire harness 9, the second corrugated portion 21b may be provided in the middle of the under-floor straight portion 23a of the straight portion 23.

The section of the under-floor straight portion 23a is a substantially rectangular shape in the direction perpendicular to the tube axial direction. The under-floor straight portion 23a is straight, extending perfectly straightly in the tube axial direction.

In the embodiment, as illustrated in FIG. 4, a portion of the under-floor straight portion 23a in a sectional view forms a bellows-shaped portion 23b that is wavy in a tube circumferential direction. That is, the corrugated portion 21 has a bellows shape in which recessions and protrusions are repeatedly disposed in the tube axial direction, and in contrast, the bellows-shaped portion 23b has a bellows shape in such a way that the bellow-shaped portion 23b is wavy in shape in the tube circumferential direction perpendicular to the axial direction. Such a bellows shape enables the bellows-shaped portion 23b to be more flexible than a portion (for example, side walls 23e which will be described later) of the under-floor straight portion 23a other than the bellows-shaped portion 23b.

More specifically, the bellows-shaped portion 23b is formed in at least a lower wall 23c of the under-floor straight portion 23a with a substantially rectangular section while the lower wall 23c is positioned on the lower side when the wire harness 9 is routed. In the embodiment, the bellows-shaped portions 23b are respectively formed in the lower wall 23c and an upper wall 23d facing the lower wall 23c.

As being apparent from FIG. 4, the under-floor straight portion 23a includes the side walls 23e connected to the lower wall 23c and the upper wall 23d. The side walls 23e are perpendicularly formed with respect to wall surfaces (substantially wall surface) of the upper wall 23d and the lower wall 23c.

In the under-floor straight portion 23a, the lower wall 23c and the upper wall 23d are connected to the side walls 23e via corner portions 23f. Accordingly, the corner portion 23f with high rigidity limits the vertical bending of the under-floor straight portion 23a, and rigidity of the under-floor straight portion 23a is increased by the corner portions 23f compared to when the corner portions 23f are not provided.

The clamp 40 illustrated in FIG. 2 includes a tube mounting portion 41 formed to conform the sheath shape of the straight portion 23, and a cantilever-shaped fixing portion 42 continuous with the tube mounting portion 41. A bolt insertion hole (not illustrated) is formed to pass through the fixing portion 42. The wire harness 9 is mounted on and fixed to a fixation target 43 (for example, the vehicle under-floor panel 11) using a bolt 44 inserted into the bolt insertion hole. The routing of a path is complete by mounting and fixing the wire harness 9 to the fixation target 43.

A clip, a grommet, a protector, and the like are examples of post-installed members other than the clamp 40. The clamp 40 is a vehicle-mounted portion, and a portion of the clamp 40 serving as a vehicle-mounted portion may be molded with resin, and integral with the straight portion 23.

Shielded connectors 50 are respectively provided at both ends of the wire harness 9. One of the shielded connectors 50 is connected to the inverter unit 4, and the other shielded connector 50 is connected to the battery 5. In the embodiment, the shielded connector 50 is connected and fixed to the high voltage electrically conductive path 16 and the low voltage electrically conductive path 37 extracted from the corrugated portion 21, and to an electromagnetic shielding member 17.

In FIG. 4, the high voltage electrically conductive path 16 includes two high-voltage circuits 32, and the low voltage electrically conductive path 37 includes one low-voltage circuit 38. The high-voltage circuit 32 has a long length in order for the wire harness 9 to electrically connect the inverter unit 4 and the battery 5 (the junction block 12) together.

The high-voltage circuit 32 is a well-known high-voltage electric wire, and includes a conductor 35, and an insulator 36 covering the conductor 35.

The conductor 35 is made of copper, a copper alloy, aluminum, or an aluminum alloy, and is formed by twisting wire strands (made of any one of these metals) together. The conductor 35 is not limited to twisted wires, and may be one strand wire with a rectangular or circular section. The insulator 36 made of an insulating resin material is formed on the sheath surface of the conductor 35 by extrusion molding.

In the embodiment, the high-voltage circuit 32 adopts the configuration of a well-known high-voltage electric wire; however, the configuration of the high-voltage circuit 32 is not limited to that in the embodiment. That is, a high-voltage circuit, which is configured such that an insulator is provided on a well-known busbar, may be adopted. The number of high-voltage circuits 32 is not limited to two, and may be one, or three or more.

The two high-voltage circuits 32 include a shielding member 33 covering the two high-voltage circuits 32, and a sheath 34 provided on the outside of the shielding ember 33.

The shielding member 33 is an electromagnetic shielding member (shielding member that counteracts against electromagnetic waves) that collectively covers the two high-voltage circuits 32. For example, the shielding member 33 is formed by braiding a large number of metal wires into a tubular shape. The shielding member 33 is formed to have substantially the same length as the entire length of the two high-voltage circuits 32. An end portion of the shielding member 33 is connected to the shielded case (not illustrated) of the inverter unit 4 (refer to FIG. 1) via the shielded connecter 50.

For example, conductive metal foil, or a member including the metal foil may be adopted as the shielding member 33 insofar as the conductive metal foil or the member including the metal foil is capable of counteracting against electromagnetic waves.

The sheath 34 with a predetermined thickness is formed of an insulating resin material on the outside of the shielding member 33 by extrusion molding. The sheath 34 is disposed in an outermost layer of the high voltage electrically conductive path 16. In the manufacturing of the wire harness 9, the sheath 34 is processed in such a way that the sheath member 33 is exposed a predetermined length from each end of the sheath member 33. The sheath 34 after the ends are processed is slightly longer than the sheath member 15. The high voltage electrically conductive path 16 may not be provided with the sheath 34.

In contrast, electrical power is supplied from a low-voltage battery (not illustrated) to various devices via the low-voltage circuit 38. The low-voltage circuit 38 includes a conductor 35', and an insulator 36' covering the conductor 35'. The low-voltage circuit 38 is disposed on the outside of the shielding member 33 such that the low-voltage circuit 38 is not interfered by electromagnetic waves from the high-voltage circuits 32.

Hereinafter, the manufacturing and transportation of the wire harness 9, and the routing of the path of the wire harness 9 will be described. The wire harness 9 is manufactured by inserting the high voltage electrically conductive path 16 (and the low voltage electrically conductive path 37) into the sheath member 15, and by respectively providing the shielded connectors 50 at both ends of the wire harness 9.

The manufactured wire harness 9 is flexed to fold the second corrugated portion 21b, the entire length of the wire harness 9 is reduced, and the wire harness 9 is packed to have the minimum width. That is, the entirety of the wire harness 9 is compactly packed. The wire harness 9 is transported in a compact state.

The transported wire harness 9 is supplied to a mounting step of mounting the wire harness 9 in the hybrid vehicle 1. As illustrated in FIG. 2, the routing of the path of the wire harness 9 is complete by mounting and fixing the wire harness 9 to the fixation target 43 using the clamp 40 while flexing the first corrugated portion 21a at required angle along the routing path of the vehicle under-floor panel 11 of the hybrid vehicle 1.

Hereinafter, the effects of the wire harness 9 in the embodiment will be described. FIG. 5 is a table illustrating various performance characteristics of the under-floor straight portion 23a of the sheath member 15 in the embodiment, and various performance characteristics of an under-floor straight portion of a sheath member in each of comparative examples. In FIG. 5, a triple-circle mark represents the best performance, performance is decreased in the order of a double-circle mark, a circle mark, and a triangle mark, and an X mark represents the worst performance.

As illustrated in FIG. 5, first, a sheath member 100 in a first comparative example has a rectangular section. That is, the sheath member 100 is configured to include an upper wall 101, a lower wall 102, and side walls 103 (each of which is made of a flat plate) perpendicularly formed with respect to wall surfaces of the upper wall 101 and the lower wall 102. The upper wall 101 and the lower wall 102 are connected to the side walls 103 via corner portions 104.

Since the side walls 103 are connected to the upper wall 101 and the lower wall 102 via the corner portions 104, the corner portions 104 with high rigidity limit the vertical bending of the sheath member 100, and rigidity of the sheath member 100 is increased by the corner portions 104 compared to when the corner portions 104 are not provided. Accordingly, the rigidity of the sheath member 100 in the first comparative example is represented by a triple-circle mark.

However, since the sheath member 100 in the first comparative example has a rectangular section, when a flying stone collides with the lower wall 102, the sheath member 100 is not capable of absorbing and distributing impact of the flying stone, and cracking of the lower wall 102 may occur. Accordingly, flying stone resistance performance of the sheath member 100 in the first comparative example is represented by an X mark.

Since the sheath member 100 has a rectangular section, an inner space of the sheath member 100 is large, and vibration occurring when a vehicle travels may cause a high voltage electrically conductive path to vertically rattle in the sheath member 100. Accordingly, electric wire rattling suppression of the sheath member 100 in the first comparative example is represented by an X mark.

Cost advantage (material costs required to give predetermined rigidity) of the sheath member 100 in the first comparative example is represented by a double-circle mark.

A sheath member 200 in a second comparative example has a substantially elliptical section. More specifically, each of an upper wall 201 and a lower wall 202 is curved outward at a predetermined curvature R1. Side walls 203 are curved outward at predetermined curvature R2.

Since the side walls 203 are not connected to the upper wall 201 and the lower wall 202 via corner portions, the sheath member 200 is prone to vertical bending, and it is said that rigidity of the sheath member 200 is by no means high. Accordingly, the rigidity of the sheath member 200 in the second comparative example is represented by an X mark.

Since the sheath member 200 in the second comparative example has a substantially rectangular section, when a flying stone collides with the lower wall 202, the lower wall 202 is capable of reducing impact of the flying stone. That is, when a flying stone collides with the lower wall 202, the lower wall 202 curved outward at the predetermined curvature R1 reduces impact of the flying stone by deflecting the fly stone in another direction. Accordingly, flying stone resistance performance of the sheath member 200 in the second comparative example is represented by a circle mark.

Since the sheath member 200 has a substantially elliptical section, an inner space of the sheath member 200 is large, and vibration occurring when a vehicle travels may cause a high voltage electrically conductive path to vertically rattle in the sheath member 200. Accordingly, electric wire rattling suppression of the sheath member 200 in the second comparative example is represented by an X mark.

Cost advantage (material costs required to give predetermined rigidity) of the sheath member 200 in the second comparative example is represented by an X mark.

Unlike the above-described two examples, in the under-floor straight portion 23a of the sheath member 15 according to the embodiment, the upper wall 23d and the lower 23c are connected to the side walls 23e via the corner portions 23f. Accordingly, similar to the first comparative example, it is said that vertical bending is limited, and the rigidity of the sheath member 100 is high compared to when the corner portions 23f are not provided. Accordingly, the rigidity of the sheath member 15 in the embodiment is represented by a circle mark.

Since the bellows-shaped portion 23b is formed in the lower wall 23c of the under-floor straight portion 23a in the embodiment, when a flying stone collides with the lower wall 23c, the lower wall 23c is capable of absorbing and distributing impact of the flying stone. That is, when a flying stone collides with the lower wall 23c, the bellows-shaped portion 23b is vertically flexed to absorb impact of the flying stone.

Figure 6:
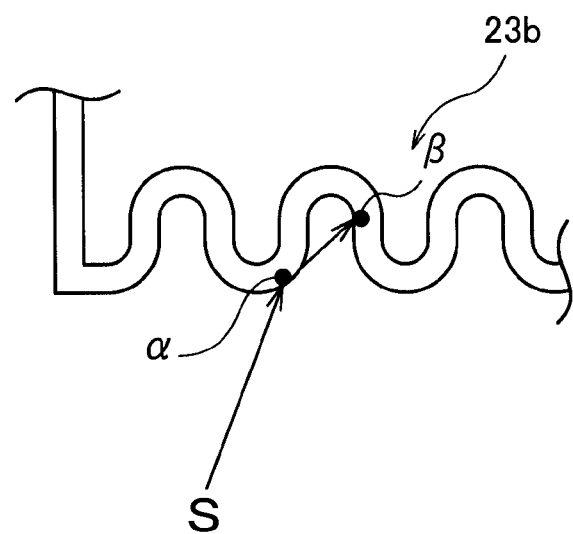
FIG. 6 is a view illustrating the distribution of impact by a bellows-shaped portion.

Since the bellows-shaped portion 23b has a wave-like shape, a flying stone may collide with not only one spot but also multiple spots on the bellows-shaped portion 23b. FIG. 6 is a view illustrating the distribution of impact by the bellows-shaped portion 23b. As illustrated in FIG. 6, when a flying stone S collides with a downward protruding portion α of the bellows-shaped portion 23b, the flying stone S is deflected in another direction by the roundness of the downward protruding portion α. The flying stone S collides with an upward protruding portion β of the bellows-shaped portion 23b. As such, when a flying stone collides with multiple spots, impact of the flying stone is not concentrated at one spot, and is distributed in another direction.

Accordingly, flying stone resistance performance of the sheath member 15 in the embodiment is represented by a double-circle mark.

Referring again to FIG. 5, since the bellows-shaped portion 23b is formed in the under-floor straight portion 23a in the embodiment, an inner space of the sheath member 15 is small compared to the first and second comparative examples. Accordingly, vibration occurring when a vehicle travels is unlikely to cause the high-voltage conductive path 16 and the low voltage electrically conductive path 37 to vertically rattle in the sheath member 15, and electric wire rattling suppression of the sheath member 15 is represented by a double-circle mark.

Since material costs are required to form the bellows-shaped portion 23b of the under-floor straight portion 23a in the embodiment, cost advantage of the sheath member 15 is represented by a triple-circle mark.

As being apparent from the above description, since it is easy to give sufficient rigidity to the sheath member 15 in the embodiment (rigidity: circle mark), and the sheath member 15 is capable of absorbing and distributing impact of a flying stone (flying stone resistance performance: double-circle mark), it is possible to suppress degradation of ease of assembly, and to reduce the possibility of cracking.

In the wire harness 9 according to the embodiment, a portion of the under-floor straight portion 23a in a sectional view forms the bellows-shaped portion 23b that is wavy in shape in the tube circumferential direction. The bellows-shaped portion 23b is more flexible than a portion of the under-floor straight portion 23a other than the bellows-shaped portion 23b. As a result, even if a flying stone comes into contact with a portion of the bellows-shaped portion 23b, the bellows-shaped portion 23b more flexible than other portions is capable of absorb impact of the flying stone. Since the bellows-shaped portion 23b has a wave-like shape, the bellows-shaped portion 23b is capable of distributing impact of a flying stone, and reducing the possibility of cracking. Since a portion of the under-floor straight portion 23a in a sectional view forms the bellows-shaped portion 23b, and other portions are not formed in a bellows shape, the under-floor straight portion 23a has sufficient rigidity, and is capable of suppressing degradation of ease of assembly. Particularly, since the bellows-shaped portion 23b is wavy in shape in the tube circumferential direction, the bellows-shaped portion 23b is unlikely to be bent in the tube axial direction, and a decrease in the rigidity of the bellows-shaped portion 23b is suppressed. Accordingly, it is possible to provide the wire harness 9 with the sheath member 15 suppressing degradation of ease of assembly and reducing the possibility of cracking.

Since the under-floor straight portion 23a has a substantially rectangular section, and the bellows-shaped portion 23b is formed in at least the lower wall 23c positioned on the lower side when the wire harness 9 is routed, the bellows-shaped portion 23b is formed at a spot with which a flying stone is most likely to come into contact, and thus it is possible to further reduce the possibility of cracking.

Hereinafter, a second embodiment of the present invention will be described. The wire harness 9 in the second embodiment is the same as in the first embodiment except that the configuration and the effects are partially different. Hereinafter, the points of difference between the second embodiment and the first embodiment will be described.

Figure 7:
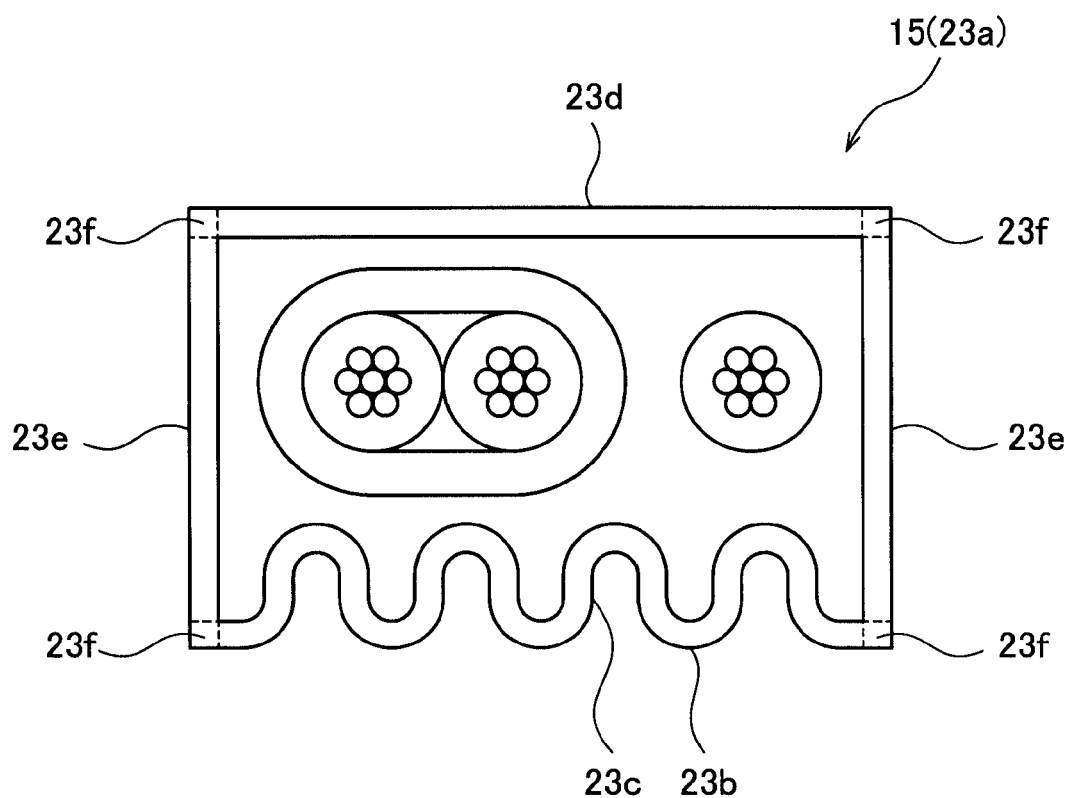
FIG. 7 is a sectional view of the sheath member (under-floor straight portion) of the wire harness in a second embodiment.

FIG. 7 is a sectional view of the sheath member (the under-floor straight portion 23a) 15 of the wire harness 9 in the second embodiment. As illustrated in FIG. 7, the under-floor straight portion 23a has a substantially rectangular section similar to the first embodiment; however, the bellows-shaped portion 23b is formed only in the lower wall 23c positioned on the lower side when the wire harness 9 is routed. The upper wall 23d is formed in the shape of a flat plate.

Similar to the first embodiment, in the under-floor straight portion 23a, the upper wall 23d and the lower wall 23c are connected to the side walls 23e via the corner portions 23f. For this reason, the under-floor straight portion 23a includes the corner portions 23f, and it is possible to more easily give sufficient rigidity to the under-floor straight portion 23a.

FIG. 8 is a table illustrating various performance characteristics of the under-floor straight portion 23a of the sheath member 15 in the second embodiment, and various performance characteristics of the under-floor straight portion of the sheath member in each of the comparative examples. In FIG. 8, a triple-circle mark represents the best performance, performance is decreased in the order of a double-circle mark, a circle mark, and a triangle mark, and an X mark represents the worst performance. Since the first and second comparative examples illustrated in FIG. 8 are the same as those illustrated in FIG. 5, the description thereof will be omitted.

In the under-floor straight portion 23a of the sheath member 15 according to the second embodiment illustrated in FIG. 8, the upper wall 23d and the lower wall 23c are connected to the side walls 23e via the corner portions 23f. For this reason, it is said that the corner portions 23f with high rigidity limit the vertical bending of the sheath member 15, and rigidity of the sheath member 15 is increased by the corner portions 23f compared to when the corner portions 23f are not provided. Accordingly, the rigidity of the sheath member 15 in the second embodiment is represented by a double-circle mark.

Since the bellows-shaped portion 23b is formed in the lower wall 23c of the under-floor straight portion 23a in the second embodiment similar to the first embodiment, when a flying stone collides with the lower wall 23c, the lower wall 23c is capable of absorbing and distributing impact of the flying stone. Accordingly, flying stone resistance performance of the sheath member 15 in the second embodiment is represented by a double-circle mark.

Since the bellows-shaped portion 23b is formed in the lower wall 23c of the under-floor straight portion 23a in the second embodiment, an inner space of the under-floor straight portion 23a is small, and vibration occurring when a vehicle travels is unlikely to cause the high-voltage conductive path 16 and the low voltage electrically conductive path 37 to vertically rattle in the under-floor straight portion 23a. Accordingly, electric wire rattling suppression of the sheath member 15 in the second embodiment is represented by a double-circle mark.

Since the bellows-shaped portion 23b is formed in only the lower wall 23c of the under-floor straight portion 23a in the embodiment, less material costs than the first embodiment are required, and cost advantage (material costs required to give predetermined rigidity) of the sheath member 15 is represented by a circle mark.

As being apparent from the above description, since it is easy to give sufficient rigidity to the sheath member 15 in the second embodiment (rigidity: double-circle mark), and the sheath member 15 is capable of absorbing and distributing impact of a flying stone (flying stone resistance performance: double-circle mark), it is possible to suppress degradation of ease of assembly, and to reduce the possibility of cracking.

According to the second embodiment, similar to the first embodiment, it is possible to provide the wire harness 9 with the sheath member 15 suppressing degradation of ease of assembly and reducing the possibility of cracking. It is possible to further reduce the possibility of cracking, and to more easily to give sufficient rigidity.

In the under-floor straight portion 23a, the upper wall 23d and the lower 23c are connected to the side walls 23e via the corner portions 23f. For this reason, the corner portions 23f with high rigidity limit the vertical bending of the under-floor straight portion 23a, and it is possible to more easily give sufficient rigidity to the under-floor straight portion 23a.

Since the bellows-shaped portion 23b is formed in only the lower wall 23c, that is, the bellows-shaped portion 23b is formed at a spot with which a flying stone is most likely to come into contact, and the other three surfaces are not formed in a bellows shape, it is possible to reduce manufacturing costs.

Hereinafter, a third embodiment of the present invention will be described. The wire harness 9 in the third embodiment is the same as in the first embodiment except that the configuration and the effects are partially different. Hereinafter, the points of difference between the third embodiment and the first embodiment will be described.

Figure 9:
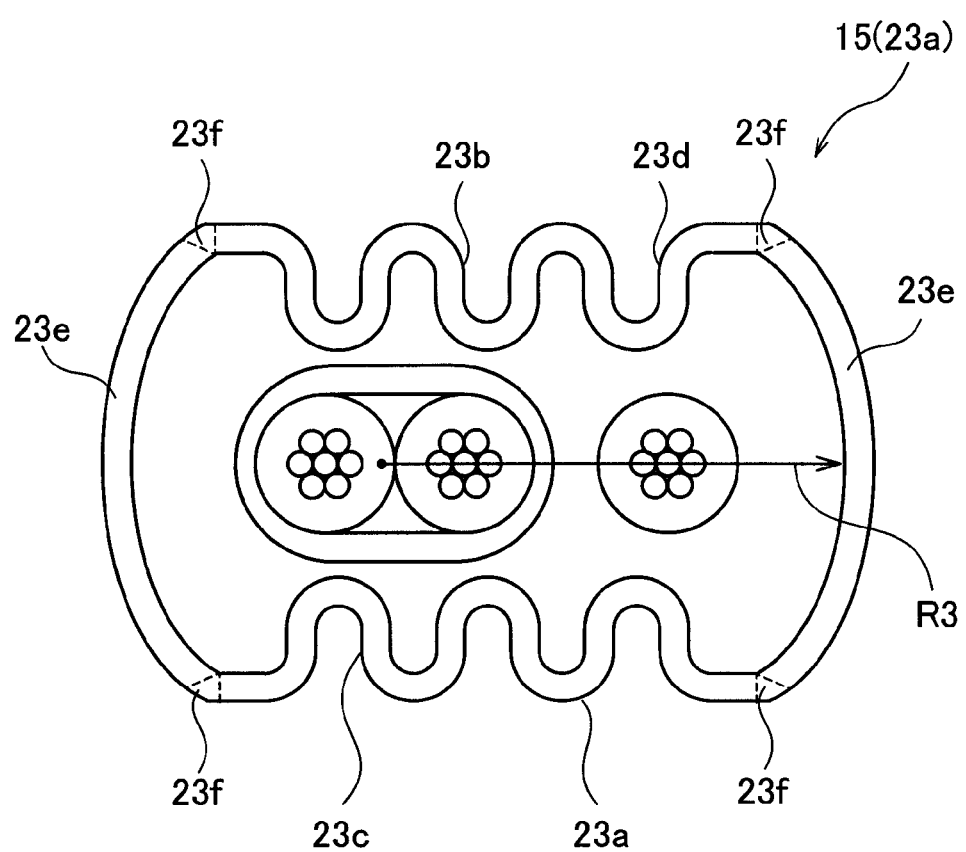
FIG. 9 is a sectional view of the sheath member (under-floor straight portion) of the wire harness in a third embodiment.

FIG. 9 is a sectional view of the sheath member (the under-floor straight portion 23a) 15 of the wire harness 9 in the third embodiment. As illustrated in FIG. 9, the under-floor straight portion 23a has a substantially rectangular section similar to the first embodiment; however, the side walls 23e are curved outward at a predetermined curvature R3.

In the under-floor straight portion 23a, the side walls 23e are curved outward at the predetermined curvature R3, but are connected to the lower wall 23c and the upper wall 23d via the corner portions 23f. For this reason, the under-floor straight portion 23a includes a high-rigidity portion such as the corner portions 23f, and it is possible to more easily give sufficient rigidity to the under-floor straight portion 23a.

According to the third embodiment, similar to the first embodiment, it is possible to provide the wire harness 9 with the sheath member 15 suppressing degradation of ease of assembly and reducing the possibility of cracking. In addition, it is possible to further reduce the possibility of cracking.

Similar to the first embodiment, a high-rigidity portion such as the corner portion 23f limits the vertical bending of the under-floor straight portion 23a, and it is possible to more easily to give sufficient rigidity to the under-floor straight portion 23a.

The present invention has been described based on the embodiments; however, the present invention is not limited to these embodiments, and modification may be made to the embodiments, and the embodiments may be combined together insofar as the modifications and the combinations do not depart from the purport of the present invention. The wire harness 9 may be applied to not only hybrid vehicles but also electric vehicles.

Here, features of the above-described embodiment of the wire harness in the present invention are collectively and briefly described below in [1] to [4].

[1] A wire harness (9) provided with:
an electrically conductive path (a high voltage electrically conductive path 16), and
a tubular sheath member (15) into which the electrically conductive path (the high voltage electrically conductive path 16) is inserted,
wherein the sheath member (15) includes a straight portion (a second sheath portion 23) having strength to limit bending,
wherein a bellows-shaped portion (23b) which is wavy in shape in a tube circumferential direction, is formed in a portion of the straight portion (the second sheath portion 23) in a sectional view,
wherein the bellows-shaped portion (23b) is more flexible than a portion of the straight portion (the second sheath portion 23) other than the bellows-shaped portion (23b).

[2] The wire harness (9) according to the above-described [1],
wherein the straight portion (the second sheath portion 23) includes a substantially rectangular section, and
wherein the bellows-shaped portion (23b) is formed on at least a lower wall (23c) positioned on a lower side when the wire harness (9) is routed.

[3] The wire harness (9) according to the above-described [2],
wherein the straight portion (the second sheath portion 23) includes the lower wall (23c), an upper wall (23d) facing the lower wall (23c), and side walls (23e) that are connected to the lower wall (23c) and the upper wall (23d) via corner portions (23f).

[4] The wire harness (9) according to the above-described [2] or [3], wherein the bellows-shaped portion (23b) is formed in only the lower wall (23c) of the straight portion (the second sheath portion 23).

The present invention has been described in detail with reference to the specific embodiments, and it is apparent to persons skilled in the art that modifications or corrections can be made to the embodiments in various forms insofar as the modifications or the corrections do not depart from the spirit and the scope of the present invention.

This application is claimed based on Japanese Patent Application No. 2013-170338, filed on Aug. 20, 2013, the content of which is incorporated herein by reference.

INDUSTRIAL APPLICABILITY

According to the present invention, the wire harness is capable of including a sheath member suppressing degradation of ease of assembly, and reducing the possibility of cracking. The present invention with these effects is effectively applied to a wire harness.

REFERENCE SIGNS LIST

1: hybrid vehicle
2: engine
3: motor unit
4: inverter unit
5: battery
6: engine compartment
7: vehicle rear portion
8, 9: wire harness
11: vehicle under-floor panel
12: junction block
13: rear end
14: front end
15: sheath member
16: high voltage electrically conductive path (electrically conductive path)
17: electromagnetic shielding member
21: corrugated portion (first sheath portion)
21a: first corrugated portion (sheath portion for routing)
21b: second corrugated portion (sheath member for packing)
23: straight portion (second sheath portion)
23a: under-floor straight portion
23b: bellows-shaped portion
23c: lower wall
23d: upper wall
23e: side walls
23f: corner portion
26: recessed portion
27: protruding portion
32: high voltage circuit
33: shielding member
34: sheath
35, 35': conductor
36, 36': insulator
37: low voltage electrically conductive path
38: low-voltage circuit
40: clamp
41: tube mounting portion
42: fixing portion
43: fixation target
44: bolt
50: shielded connector

What is claimed is:

1. A wire harness comprising:
an electrically conductive path; and
a tubular sheath member into which the electrically conductive path is inserted,
wherein the sheath member includes a straight portion and a corrugated portion, the straight portion has strength to limit bending, the corrugated portion is connected to the straight portion, and the corrugated portion includes a plurality of recess portions and a plurality of protruding portions alternatingly arranged with the recessed portions in an axial direction of the sheath member,
wherein the straight portion includes a bellows-shaped portion which is wavy in shape in a tube circumferential direction that is perpendicular to the axial direction, and the straight portion includes another portion that is connected with the bellows-shaped portion, and
wherein the bellows-shaped portion is more flexible than the another portion of the straight portion.

2. The wire harness according to claim 1,
wherein the straight portion includes a substantially rectangular section, and
wherein the bellows-shaped portion is formed on at least a lower wall positioned on a lower side when the wire harness is routed.

3. The wire harness according to claim 2,
wherein the straight portion includes the lower wall, an upper wall facing the lower wall, and side walls that are connected to the lower wall and the upper wall via corner portions.

4. The wire harness according to claim 3,
wherein the bellows-shaped portion is formed in only the lower wall of the straight portion.

5. The wire harness according to claim 2,
wherein the bellows-shaped portion is formed in only the lower wall of the straight portion.

6. The wire harness according to claim 1,
wherein the sheath member has a shape which does not include a seam passing through the sheath member from an outer circumferential surface to an inner circumferential surface of the sheath member.

* * * * *